US010899215B2

United States Patent
Grajeda et al.

(10) Patent No.: US 10,899,215 B2
(45) Date of Patent: Jan. 26, 2021

(54) HYDRAULIC MOUNT APPARATUS

(71) Applicant: BeijingWest Industries Co., Ltd., Beijing (CN)

(72) Inventors: Yinko I. Grajeda, Bellbrook, OH (US); Michael W. Hurtt, Waynesville, OH (US)

(73) Assignee: BEIJINGWEST INDUSTRIES CO., LTD., Beijing (CN)

( * ) Notice: Subject to any disclaimer, the term of this patent is extended or adjusted under 35 U.S.C. 154(b) by 196 days.

(21) Appl. No.: 16/045,653

(22) Filed: Jul. 25, 2018

(65) Prior Publication Data

US 2019/0077243 A1 Mar. 14, 2019

Related U.S. Application Data

(60) Provisional application No. 62/556,948, filed on Sep. 11, 2017.

(51) Int. Cl.
*B60K 5/12* (2006.01)
*F16F 13/26* (2006.01)
*F16F 13/30* (2006.01)

(52) U.S. Cl.
CPC .......... *B60K 5/1208* (2013.01); *B60K 5/1283* (2013.01); *F16F 13/264* (2013.01); *F16F 13/305* (2013.01); *F16F 2222/06* (2013.01)

(58) Field of Classification Search
CPC ... B60K 5/1208; B60K 5/1283; F16F 13/264; F16F 13/305
See application file for complete search history.

(56) References Cited

U.S. PATENT DOCUMENTS

| 4,583,723 A | 4/1986 | Ozawa |
| 4,778,158 A | 10/1988 | Hoying et al. |

(Continued)

FOREIGN PATENT DOCUMENTS

| CN | 101936360 A | 1/2011 |
| CN | 102434619 A | 5/2012 |

(Continued)

OTHER PUBLICATIONS

First Office Action and search report dated Oct. 29, 2019 for counterpart Chinese patent application No. 201810909114.6, along with machine EN translation downloaded from EPO.

(Continued)

*Primary Examiner* — Vishal R Sahni
(74) *Attorney, Agent, or Firm* — William H. Honaker; Dickinson Wright PLLC

(57) ABSTRACT

A hydraulic mount apparatus comprises a housing having an upper portion and a lower portion and defining a housing chamber. A partition member disposed therein and divides the housing chamber into a pumping chamber and a receiving chamber. A decoupler including a magnetic actuator is attached to the partition member. A moving member is disposed in the pumping chamber and attached to the decoupler. The moving member includes at least two magnetic inserts disposed therein, spaced from one another, to move the moving member from a first position to a second position in response to a magnetic field. The first position is defined as the moving member being spaced from the decoupler. The second position is defined as the moving member being attached to the decoupler.

20 Claims, 8 Drawing Sheets

(56) References Cited

U.S. PATENT DOCUMENTS

| | | | |
|---|---|---|---|
| 5,176,368 A | 1/1993 | Shtarkman | |
| 5,573,088 A | 11/1996 | Daniels | |
| 5,961,104 A * | 10/1999 | Gennesseaux | H01F 7/1638 |
| | | | 267/140.14 |
| 6,276,673 B1 * | 8/2001 | Hibi | F16F 13/264 |
| | | | 267/140.14 |
| 8,327,984 B2 | 12/2012 | Foister et al. | |
| 8,989,962 B2 | 3/2015 | Kim et al. | |
| 9,004,243 B2 | 4/2015 | Nehl et al. | |
| 9,022,368 B2 | 5/2015 | Marienfeld et al. | |
| 9,051,989 B2 | 6/2015 | Schumann et al. | |
| 9,322,451 B2 | 4/2016 | Schumann et al. | |
| 9,440,524 B2 | 9/2016 | Farjoud et al. | |
| 2001/0032919 A1 * | 10/2001 | Hagino | F16F 13/264 |
| | | | 248/562 |
| 2009/0039577 A1 * | 2/2009 | Ishiguro | B60K 5/1283 |
| | | | 267/140.13 |
| 2011/0121223 A1 | 5/2011 | Ulicny et al. | |
| 2012/0109457 A1 * | 5/2012 | Okamoto | F16F 13/264 |
| | | | 701/36 |
| 2014/0200764 A1 * | 7/2014 | Yone | B60K 5/12 |
| | | | 701/36 |
| 2014/0284857 A1 | 9/2014 | Kim | |
| 2016/0185179 A1 | 10/2016 | Hart | |

FOREIGN PATENT DOCUMENTS

| | | |
|---|---|---|
| CN | 103029139 A | 4/2013 |
| CN | 103069192 A | 4/2013 |
| CN | 103221712 A | 7/2013 |
| DE | 4122360 A1 | 1/1993 |
| EP | 2732182 A1 | 5/2014 |
| EP | 2820321 A4 | 1/2015 |
| JP | 608540 A | 1/1984 |
| KR | 19990048063 A | 7/1997 |
| WO | 2013007140 A1 | 1/2013 |
| WO | 2014026495 A1 | 2/2014 |
| WO | 2016011812 A1 | 1/2016 |

OTHER PUBLICATIONS

European Search Report dated Apr. 3, 2019 for counterpart European patent application No. EP18193394.6.

* cited by examiner

HYDRAULIC MOUNT APPARATUS

CROSS REFERENCE TO RELATED APPLICATION

This application claims the benefit of provisional application Ser. No. 62/556,948 filed on Sep. 11, 2017, the entire disclosure of which is incorporated herein by reference in its entirety.

BACKGROUND OF THE INVENTION

1. Field of the Invention

The present invention generally relates to a hydraulic mount apparatus.

2. Description of the Prior Art

Conventional mounts exist for supporting and providing vibration isolation of vibration sources. One well-known application of these mounts is for supporting components of automotive vehicles. These mounts typically operate to provide engine vibration isolation while also to control the motion of the engine and connected powertrain components with respect to the vehicle frame or body structure. In many applications of engine and powertrain mounts, it is desirable to vary damping characteristics of the mount to provide selective isolation of vibrations at certain frequencies.

One such hydraulic mount apparatus is disclosed in U.S. Pat. No. 9,022,368 which discloses a hydraulic mount apparatus including a housing having an upper portion and a lower portion disposed on a center axis and defining a housing chamber. A partition member is disposed in the housing chamber and extending about the center axis dividing the housing chamber into a pumping chamber and a receiving chamber. The pumping chamber extends between the upper portion and the partition member. The receiving chamber extends between the lower portion and the partition member. A decoupler includes a magnetic actuator attached to the partition member separating the pumping chamber and the receiving chamber. A moving member, made from an elastomeric material, is disposed in the pumping chamber and attached to the decoupler.

SUMMARY OF THE INVENTION

The invention provides for a hydraulic mount apparatus having a simplified design and packaging with minimal affects to the hydraulic mount apparatus' geometry. In addition, the present invention provides a hydraulic mount apparatus that has improved actuation response times and operation consistency with possibility to extend to semi-active/active control and improved performance tuning.

The hydraulic mount apparatus includes a housing having an upper portion and a lower portion disposed on a center axis and defining a housing chamber. A partition member is disposed in the housing chamber dividing the housing chamber into a pumping chamber and a receiving chamber. The pumping chamber extends between the upper portion and the partition member. The receiving chamber extends between the lower portion and the partition member. A decoupler including a magnetic actuator is attached to the partition member separating the pumping chamber and the receiving chamber. A moving member, made from an elastomeric material, is disposed in the pumping chamber and attached to the decoupler spaced from the decoupler. The moving member includes at least two magnetic inserts disposed in the moving member, spaced from one another, to move the moving member from a first position to a second position in response to a magnetic field. The first position is defined as the moving member being spaced from the decoupler. The second position is defined as the moving member being attached to the decoupler.

It is a further aspect to provide a hydraulic mount apparatus. The hydraulic mount apparatus includes a housing having an upper portion and a lower portion disposed on a center axis and defining a housing chamber. A partition member is disposed in the housing chamber dividing the housing chamber into a pumping chamber and a receiving chamber. The pumping chamber extends between said upper portion and the partition member. The receiving chamber extends between the lower portion and the partition member. A decoupler including a magnetic actuator is attached to the partition member separating the pumping chamber and the receiving chamber. A moving member of an elastomeric material is disposed in the pumping chamber attached to the decoupler. The moving member includes at least two magnetic inserts disposed in the moving member and spaced from one another to move the moving member from a first position to a second position in response to a magnetic field. The first position is defined as the moving member being spaced from the decoupler. The second position is defined as the moving member being attached to the decoupler. A squeeze plate is disposed in the pumping chamber, adjacent to the moving member, to secure said moving member between said squeeze plate and said decoupler. The squeeze plate includes a solid portion, spaced from the moving member to define a gap, and a protrusion extending outwardly from the solid portion to the moving member to secure the moving member between the squeeze plate and the decoupler.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENT

Figure 1:
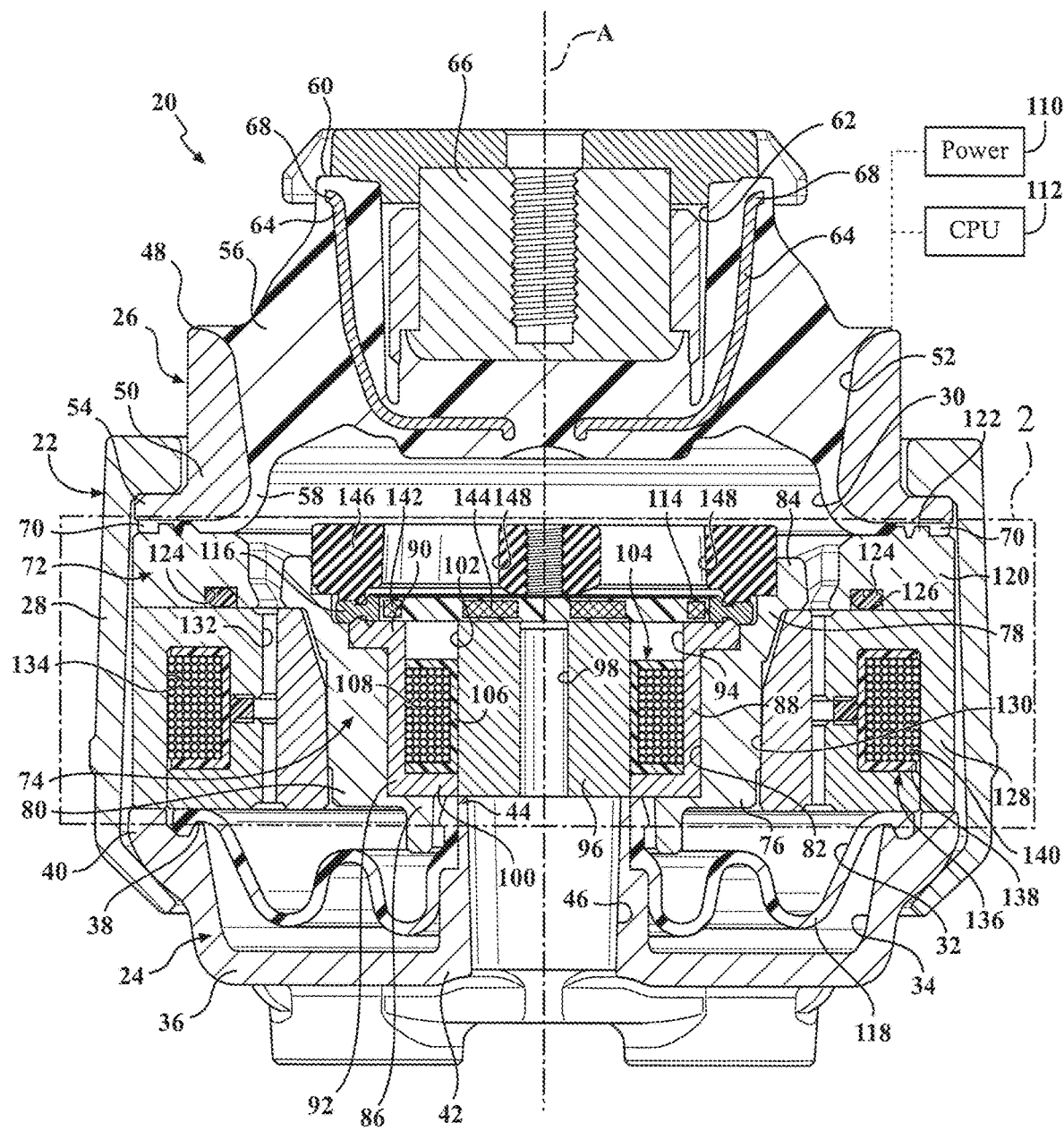
FIG. 1 is a cross-sectional view of the hydraulic mount apparatus.

Referring to the Figures, wherein like numerals indicate corresponding parts throughout the several views, a hydraulic mount apparatus 20 constructed in accordance with the enabling embodiment is generally shown in FIG. 1. Typically, the hydraulic mount apparatus 20 is used for supporting a component of a vehicle, e.g. an engine, disposed on a frame of the vehicle. It should be appreciated that the hydraulic mount can be used for supporting various other vibration sources.

As shown in FIG. 1, the hydraulic mount apparatus 20 includes a housing 22 having a lower portion 24 and an upper portion 26. The lower portion 24 and the upper portion 26 of the housing 22 are disposed on a center axis A and axially spaced from one another. A wall 28, having a generally tubular shape, is disposed on the center axis A and extending between the lower portion 24 and the upper portion 26 connecting the lower portion 24 with the upper portion 26 and defining a housing chamber 30, 32, 34 between the lower portion 24, the upper portion 26, and the wall 28.

The lower portion 24, having a generally bowl shape, extends annularly about the center axis A between a lower portion closed end 36 and a lower portion opened end 38. A lower portion lip 40 extends radially outwardly from the lower portion opened end 38, perpendicular to the center axis A, to engage the wall 28. The lower portion 24 includes a collar 42, having a generally cylindrical shape, disposed on the center axis A. The collar 42 extends outwardly from the lower portion closed end 36 and annularly about the center axis A to a distal end 44. The collar 42 defines a lower portion bore 46, having a generally cylindrical shape, extending along the center axis A between the lower portion 24 and the distal end 44 of the collar 42 for attaching the housing 22 to a vehicle.

The upper portion 26, having a generally tubular shape, is disposed on the center axis A and axially spaced from the lower portion 24. The upper portion 26 extends annularly about the center axis A between a first opened end 48 and a second opened end 50 and defines an upper portion bore 52, having a generally cylindrical shape, extending along the center axis A between the first opened end 48 and the second opened end 50. The upper portion 26 includes an upper portion lip 54, disposed at the second opened end 50, extending radially outwardly from the first opened end 48 perpendicular to the center axis A to engage the wall 28. It should be appreciated that the upper portion 26 and the lower portion 24 could have other shapes (e.g. square shaped or hexagonal shaped cross sections).

A flexible body 56, made from an elastomeric material, is disposed in the upper portion bore 52 and extends annularly about and axially along the center axis A from a flexible body lower end 58 to a flexible body upper end 60. The flexible body lower end 58 is disposed adjacent the first opened end 48 of the upper portion 26 and attached to the upper portion 26. The flexible body lower end 58 is disposed adjacent to the second opened end 50 of the upper portion 26 and attached to the upper portion 26 for deforming elastically relative to the lower portion 24 in response to an excitation movement of a vehicle. In other words, the flexible body 56 is attached to the upper portion 26 and deforms in response to an excitation movement of the vehicle, e.g. a vibrational movement. The flexible body 56 defines a flexible chamber 62 disposed adjacent to the flexible body upper end 60 and extending from the flexible body upper end 60 along the center axis A into the flexible body 56. The flexible body 56 defines a pair of insert grooves 64, disposed adjacent to and spaced from the flexible chamber 62 and one another, extending between the flexible body lower end 58 and the flexible body upper end 60.

A bushing 66, having a generally cylindrical shape, is disposed in the flexible chamber 62 for engaging a fastener to secure the flexible body 56 to the vehicle. A pair of outer inserts 68, made from metallic material, is disposed in the insert grooves 64 for providing rigidity to the flexible body 56. The flexible body 56 includes a flexible body flange 70 extending radially outwardly from the flexible body lower end 58, parallel to the upper portion lip 54, to engage the upper portion lip 54 to secure the flexible body 56 to the upper portion 26.

A partition member 72 is disposed in the housing chamber 30, 32, 34, between the upper portion 26 and the lower portion 24, extending annularly about the center axis A, dividing the housing chamber 30, 32, 34 into a pumping chamber 30 and a receiving chamber 32, 34. The pumping chamber 30 extends between the flexible body 56 and the partition member 72. The receiving chamber 32, 34 extending between the lower portion 24 and the partition member 72. A magnetorheological fluid is contained in the pumping chamber 30 and the receiving chamber 32, 34. The magnetorheological fluid, as known in the art, is responsive to modify its shear properties. More specifically, in responsive to a magnetic field applied to the magnetorheological fluid, the magnetorheological fluid has the ability to modify is shear property from a free-flowing or a viscous liquid to a semi-solid with controllable yield strength.

A decoupler 74 is attached to the partition member 72 to separate the pumping chamber 30 and the receiving chamber 32, 34 and provide additional damping force in the pumping chamber 30. The decoupler 74 includes a support member 76, made from metal material and having a generally tubular shape, attached to the partition member 72. The support member 76 extends annularly about the center axis A between a support member upper end 78 and a support member lower end 80. The support member upper end 78 is disposed in the pumping chamber 30. The support member lower end 80 is disposed in the receiving chamber 32, 34. The support member 76 defines a recess 82, having a generally cylindrical shape, extending along the center axis A between the support member upper end 78 and the support member lower end 80. A support member upper flange 84 extends radially outwardly from the support member upper end 78, annularly about the center axis A, to engage the partition member 72. The support member 76 includes a support member lower flange 86 extending radially inwardly from the support member lower end 80 and annularly about the center axis A to engage the distal end 44 of the collar 42.

The decoupler 74 includes a sleeve 88, having a generally tubular shape, disposed in the recess 82 and extending annularly about the center axis A between an upper sleeve end 90 and a lower sleeve end 92. The upper sleeve end 90 is disposed adjacent to the support member upper end 78. The lower sleeve end 92 is disposed adjacent to the support member 76 lower end. The sleeve 88 defines a hole 94, having a generally cylindrical shape, extending between the upper sleeve end 90 and the lower sleeve end 92.

The decoupler 74 includes a core 96, having a generally cylindrical shape, disposed in the hole 94 of the sleeve 88 extending between the upper sleeve end 90 and the lower sleeve end 92. The core 96 defines a passage 98, having a generally cylindrical shape, disposed in fluid communication with the lower portion bore 46 and the receiving chamber 32, 34. A lower sleeve flange 100 extends radially inwardly from the lower sleeve end 92, perpendicular to the center axis A, to engage the core 96 and defining a compartment 102 extending annularly about the center axis A between the lower sleeve flange 100, the sleeve 88, and the core 96. A magnetic actuator 104 is disposed in the compartment 102. The magnetic actuator 104 includes a first bobbin 106, having a generally spool-shape, disposed in the compartment 102 and extends annularly about the center axis A. A first coil 108 is wrapped around the first bobbin 106, electrically connected to a power source 110, for generating a magnetic field. It should be appreciated that more than one coil can be wrapped around the first bobbin 106. In addition, it should be appreciated that a controller 112, e.g. a computer or a central processing unit, can be electrically connected to the power source 110 to control the power output to the first coil 108 thereby controlling the strength of the magnetic field produced by the magnetic actuator 104.

The decoupler 74 includes a moving member 114, having a generally circular shape and made from an elastomeric material, disposed in the pumping chamber 30 on the center axis A and extending radially outwardly from the center axis A to the support member upper end 78. The moving member 114 is attached to the support member upper end 78 to separate the pumping chamber 30 from the receiving chamber 32, 34. A retainer 116, having a generally ring shape, is disposed between the moving member 114 and the support member upper end 78 and extending annularly about the center axis A. The retainer 116 can include a slot extending annularly about the center axis A to receive the moving member 114.

A diaphragm 118, made from an elastomeric material, is disposed in the receiving chamber 32, 34 extending annularly about the center axis A and between the lower portion opened end 38 and the distal end 44 of the collar 42. The diaphragm 118 is sandwiched between the lower portion 24 and the partition member 72 and the support member lower flange 86 and the distal end 44 of the collar 42. The diaphragm 118 divides the receiving chamber 32, 34 into a fluid chamber 32 and a compensation chamber 34. The fluid chamber 32 extends between the diaphragm 118 and the partition member 72. The compensation chamber 34 extends between the lower portion 24 and the diaphragm 118.

The partition member 72 includes an upper spacer 120, made of metal and having a generally circular shape, disposed in the pumping chamber 30, axially adjacent to the upper portion 26 and axially below the upper portion 26, and in engagement with the flexible body flange 70 to sandwich the flexible body flange 70 between the upper portion 26 and the upper spacer 120. The upper spacer 120 includes at least one projection 122 extending outwardly from the upper spacer 120 to engage the flexible body flange 70 for securing the flexible body flange 70 between the upper portion 26 and the upper spacer 120. The upper spacer 120 defines at least one upper spacer groove 124, disposed opposite of the at least one projection 122 and axially spaced from the at least one projection 122, extending annularly about the center axis A along the upper spacer 120. A seal 126, made from an elastomeric material, is disposed in the upper spacer 120 groove and extending annularly about the center axis A.

The partition member 72 includes an electromagnetic support ring 128, having a generally circular shape, disposed in the housing chamber 30, 32, 34 between the upper spacer 120 and the lower portion 24. The electromagnetic support ring 128 extends annularly about the center axis A to sandwich the diaphragm 118 between the electromagnetic support ring 128 and the lower portion 24 and the seal 126 between the electromagnetic support ring 128 and the upper spacer 120. The electromagnetic support ring 128 defines a concavity 130, at least one channel 132, and an electromagnetic groove 134. The concavity 130, having a generally cylindrical shape, extends along the center axis A to receive the decoupler 74. The at least one channel 132, radially spaced from the concavity 130 and the decoupler 74, extends in a parallel relationship with the center axis A to allow fluid communication between the pumping chamber 30 and the receiving chamber 32, 34. The electromagnetic groove 134, radially spaced from the at least one channel 132, extends annularly about the center axis A. A second electromagnetic field generator 136 is disposed in the electromagnetic groove 134. The second electromagnetic field generator 136 includes a second bobbin 138, having a generally spool-shape, disposed in the electromagnetic groove 134 and extending annularly about the center axis A. A second coil 140 is wrapped around the second bobbin 138, electrically connected to the power source 108, for selectively generating an additional magnetic field. It should be appreciated that more than one coil can be wrapped about the second bobbin 138.

Figure 2:
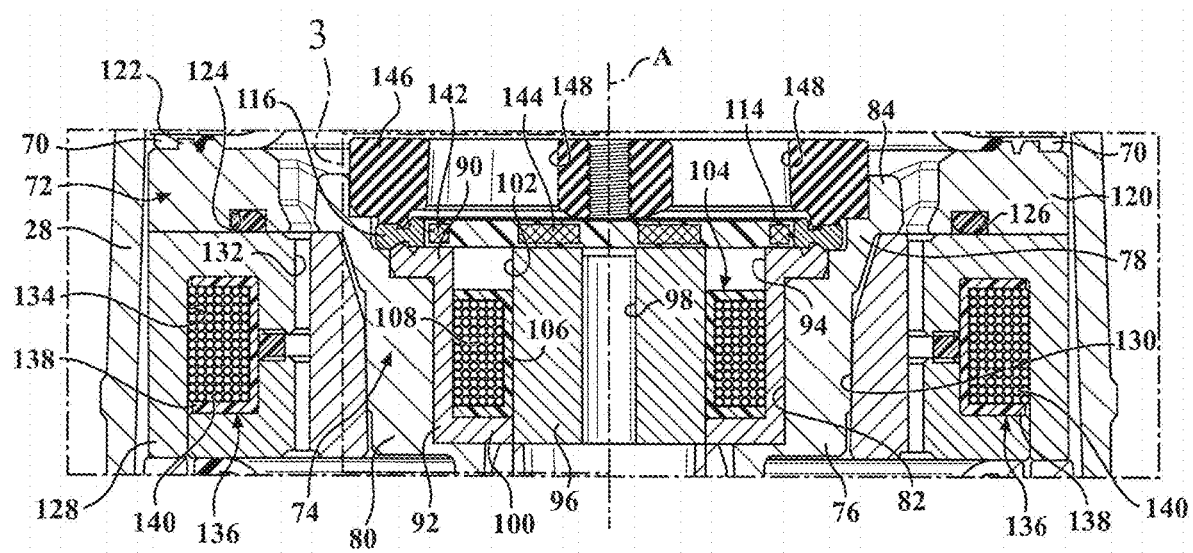
FIG. 2 is an enlarged cross-sectional fragmentary view of the decoupler of the hydraulic mount apparatus of FIG. 1.
Figure 3:
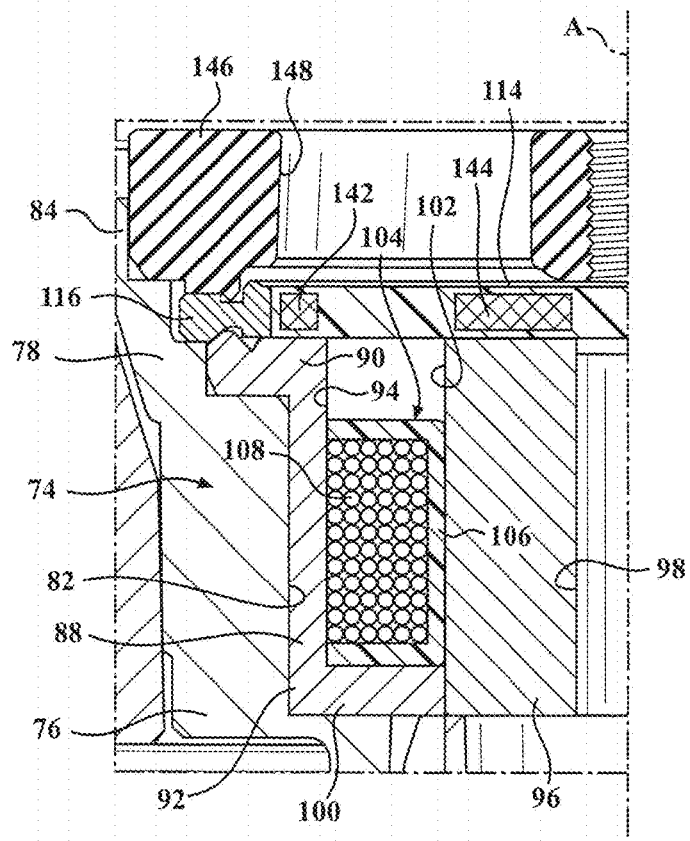
FIG. 3 is an enlarged cross-sectional fragmentary view of the decoupler of the hydraulic mount apparatus of FIG. 2.

As best shown in FIGS. 2 and 3, the moving member 114 includes at least two magnetic inserts 142, 144 disposed spaced from one another and in the moving member 114 to move the moving member 114 from a first position to a second position. In the first position, the moving member 114 is spaced from the core 96 and the sleeve 88 of the decoupler 74. While in the first position, the moving member 114 is able to flex freely in the pumping chamber 30 response to the excitation movement of the vehicle. In the second position, the moving member 114 is attached to the core 96 and the sleeve 88 of the decoupler 74. While in the second position, the movement of the moving member 114 is restricted because portions of the moving member 114 that contains the magnetic inserts 142, 144 are attached to the decoupler thereby limiting the flexibility of the moving member 114. By switching between the first position and the second position, the damping force of the moving member 114 is varied thereby allowing for performance tuning of the hydraulic mount apparatus 20. The at least two magnetic inserts 142, 144 include a first magnetic insert 142 and a second magnetic insert 144. The first magnetic insert 142, having a generally circular shape, is disposed adjacent to the upper sleeve end 90 of the sleeve 88 and extends about the center axis A. The second magnetic insert 144, having a generally circular shape, is disposed radially spaced from the first magnetic insert 142, adjacent to the core 96, and extends annularly about the first magnetic insert 142 and the center axis A. A cap 146, having a generally circular shape, is disposed in the pumping chamber 30, adjacent to the support member upper flange 84, and spaced from the moving member 114 to secure the moving member 114 between the cap 146 and the support member 76. The cap 146 defines at least one orifice 148 extending through the cap and in alignment with the hole 94 for allowing the magnetorheological fluid to flow through the cap 146. It should be appreciated that the at least one orifice 148 can include a plurality of orifices 148, radially spaced from one another, to allow the magnetorheological fluid to flow through the cap 146.

Figure 4:
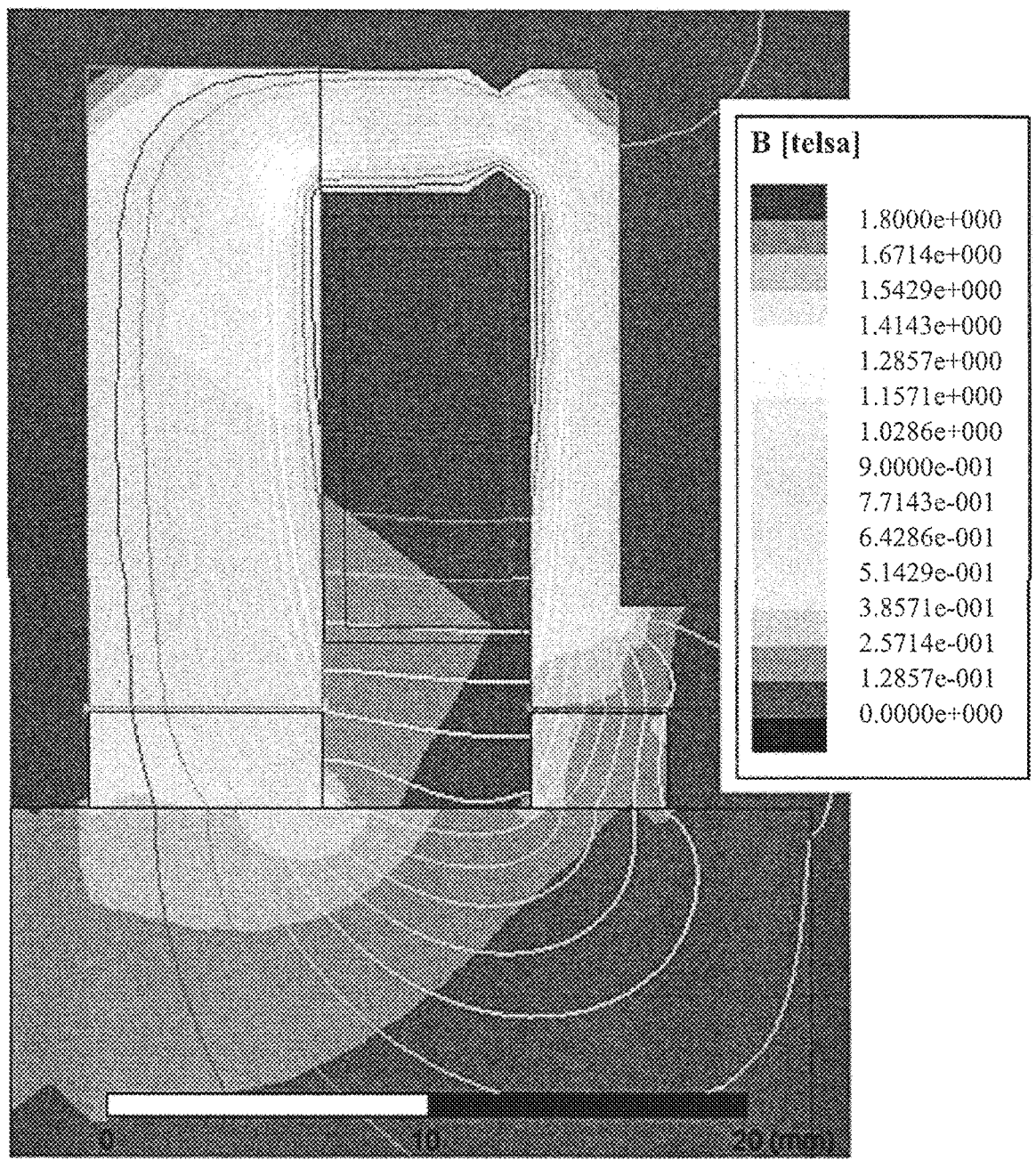
FIG. 4 is a graph showing the magnetic field of the decoupler of the hydraulic mount apparatus.
Figure 5:
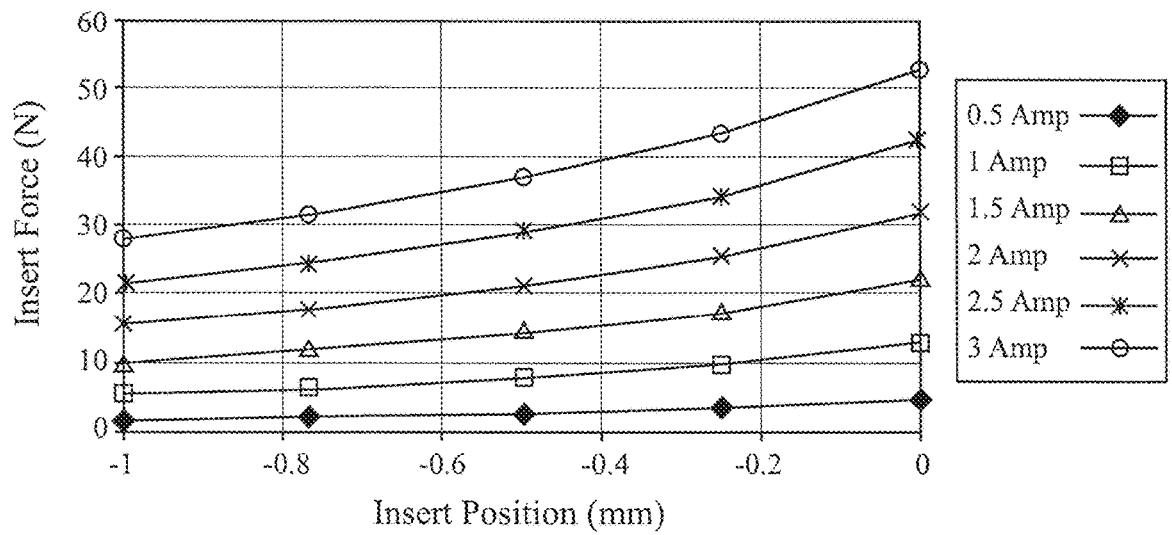
FIG. 5 is a graph showing the magnetic inserts' force versus the position of the magnetic inserts for the hydraulic mount apparatus.
Figure 6:
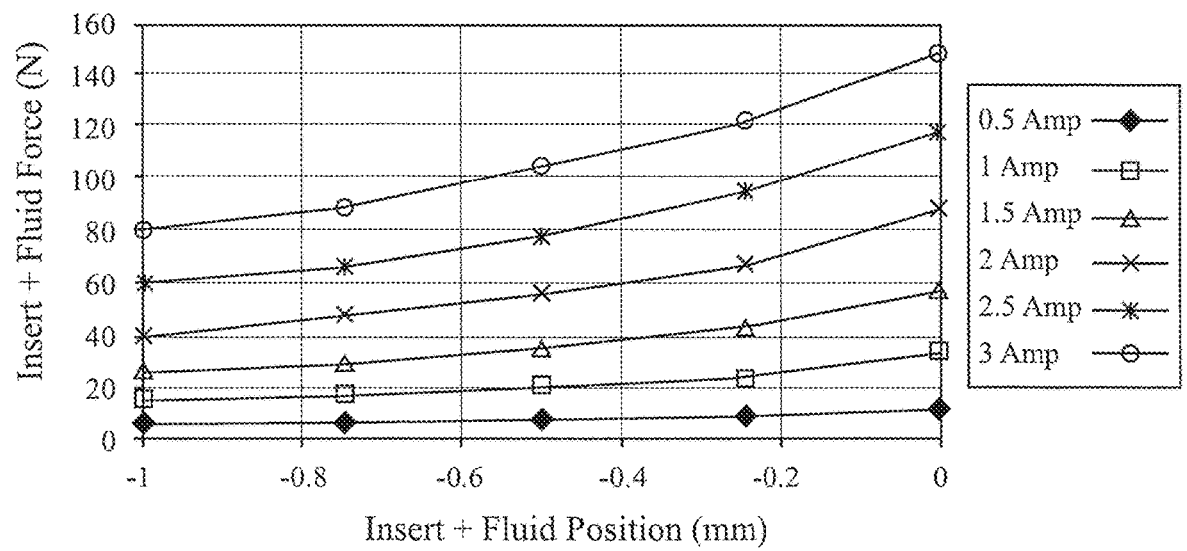
FIG. 6 is a graph showing the magnetic inserts' force and fluid force versus the position of the magnetic inserts for the hydraulic mount apparatus.

In operation, as the hydraulic mount apparatus 20 receives an excitation movement, e.g. a vibrational movement, the flexible body 56 deforms thereby causing a change in the volumes of the pumping chamber 30, the receiving chamber 32, and the compensation chamber 34. As a result, the moving member 114 flexes in the pumping chamber 30 in response to the volume change. As the moving member 114 flexes in the pumping chamber 30, the moving member 114 provides an additional damping force in the pump chamber 30 in response to the excitation movement. To change the damping rate provided by the moving member 114, power is provided to the magnetic actuator 104 by the power source 110. As the magnetic actuator 104 receives power from the power source 110, the first coil 108 of the magnetic actuator 104 energizes and produces a magnetic field. As illustrated in FIG. 4, in response to the magnetic field, the magnetic inserts 142, 144 become part of the magnetic circuit, along with the magnetorheological fluid. In addition, in response to the magnetic field, the magnetic inserts 142, 144 pull the moving member 114 including the magnetic inserts 142, 144 from the first position to the second position. In other words, in response to the magnetic field, the moving member 114 moves from being spaced from the core 96 and the sleeve 88 of the decoupler 74 to being attached to the core 96 and the sleeve 88 of the decoupler 74. As a result, the flexibility of the moving member 114 becomes limited thereby changing the rate of damping of the decoupler 74 and allow for performance tuning. The magnetic inserts' 142, 144 force (N) in response to the magnetic field vs. the position of the magnetic inserts 142, 144 are monitored and illustrated in FIG. 5. Furthermore, the magnetic inserts' 142, 144 force and the fluid force (N) in response to the magnetic field vs. the position of the magnetic inserts 142, 144 are monitored and illustrated in FIG. 6.

Figure 7:
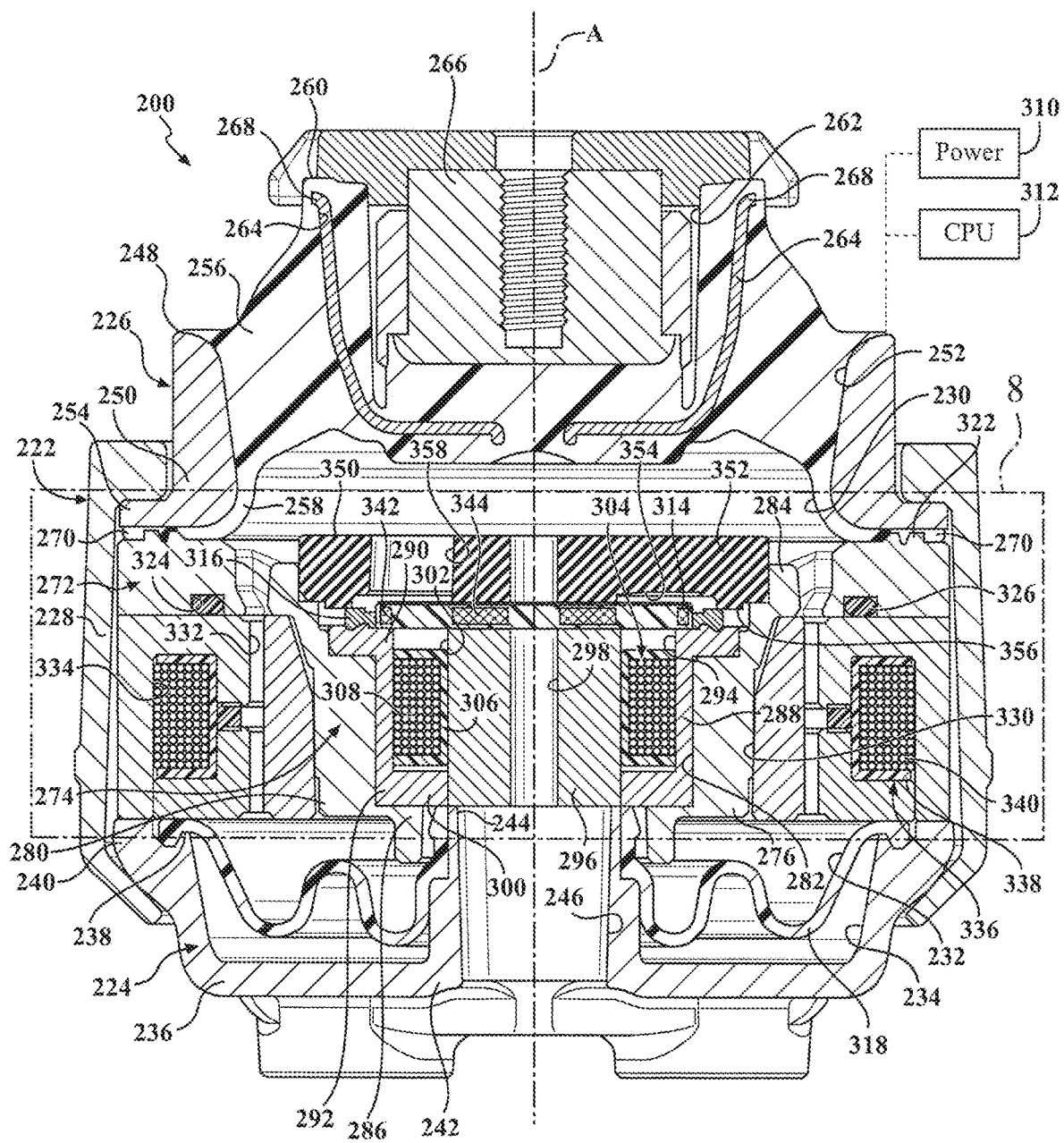
FIG. 7 is a cross-sectional view of an alternative embodiment of the hydraulic mount apparatus.

FIG. 7 illustrates an alternative embodiment of the hydraulic mount apparatus 220 constructed in according to another aspect of the invention, wherein the reference numerals used above are offset by 200 and are used to illustrate the like part of the hydraulic damper apparatus 220. The hydraulic mount apparatus 220 includes a housing 222 having a lower portion 224 and an upper portion 226. The lower portion 224 and the upper portion 226 of the housing 222 are disposed on a center axis A and axially spaced from one another. A wall 228, having a generally tubular shape, is disposed on the center axis A connecting the lower portion 224 with the upper portion 226 and defining a housing chamber 230, 232, 234 between the lower portion 224, the upper portion 226, and the wall 228.

The lower portion 224, having a generally bowl shape, extends annularly about the center axis A between a lower portion closed end 236 and a lower portion opened end 238. A lower portion lip 240 extends radially outwardly from the lower portion opened end 238, perpendicular to the center axis A, to engage the wall 228. The lower portion 224 includes a collar 242, having a generally cylindrical shape, disposed on the center axis A. The collar 242 extends outwardly from the lower portion closed end 236 and annularly about the center axis A to a distal end 244. The collar 242 defines a lower portion bore 246, having a generally cylindrical shape, extending along the center axis A between the lower portion 224 and the distal end 244 of the collar 242 for attaching the housing 222 to a vehicle.

The upper portion 226, having a generally tubular shape, is disposed on the center axis A and axially spaced from the lower portion 224. The upper portion 226 extend annularly about the center axis A between a first opened end 248 and a second opened end 250 and defines an upper portion bore 252, having a generally cylindrical shape, extending along the center axis A between the first opened end 248 and the second opened end 250. The upper portion 226 includes an upper portion lip 254, disposed at the second opened end 250, extending radially outwardly from the first opened end 248 perpendicular to the center axis A to engage the wall 228. It should be appreciated that the upper portion 226 and the lower portion 224 could have other shapes (e.g. square shaped or hexagonal shaped cross sections).

A flexible body 256, made from an elastomeric material, is disposed in the upper portion bore 252 and extends annularly about and axially along the center axis A from a flexible body lower end 258 to a flexible body upper end 260. The flexible body lower end 258 is disposed adjacent the first opened end 248 of the upper portion 226 and attached to the upper portion 226. The flexible body lower end 258 is disposed adjacent to the second opened end 250 of the upper portion 226 and attached to the upper portion 226 for deforming elastically relative to the lower portion 224 in response to an excitation movement of a vehicle. In other words, the flexible body 256 is attached to the upper portion 226 and deforms in response to an excitation movement of the vehicle, e.g. vibrational movement. The flexible body 256 defines a flexible chamber 262 disposed adjacent to the flexible body upper end 260 and extending from the flexible body upper end 260 along the center axis A into the flexible body 256. The flexible body 256 defines a pair of insert grooves 264, disposed adjacent to and spaced from the flexible chamber 262, spaced from one another, extending between the flexible body lower end 258 and the flexible body upper end 260.

A bushing 266, having a generally cylindrical shape, is disposed in the flexible chamber 262 for engaging a fastener to secure the flexible body 256 to the vehicle. A pair of outer inserts 268, made from metallic material, is disposed in the insert grooves 264 for providing rigidity to the flexible body 256. The flexible body 256 includes a flexible body flange 270 extending radially outwardly from the flexible body lower end 258, in a parallel relationship with the upper portion lip 254, for engagement with the upper portion lip 254 to secure the flexible body 256 to the upper portion 226.

A partition member 272 is disposed in the housing chamber 230, 232, 234, between the upper portion 226 and the lower portion 224, extending annularly about the center axis A, dividing the housing chamber 230, 232, 234 into a pumping chamber 230 and a receiving chamber 232, 234. The pumping chamber 230 extends between the flexible body 256 and the partition member 272. The receiving chamber 232, 234 extending between the lower portion 224 and the partition member 272. A magnetorheological fluid is contained in the pumping chamber 230 and the receiving chamber 232, 234. The magnetorheological fluid, as known in the art, is responsive to modify its shear properties. More specifically, in responsive to a magnetic field applied to the magnetorheological fluid, the magnetorheological fluid has the ability to modify is shear property from a free-flowing or a viscous liquid to a semi-solid with controllable yield strength.

A decoupler 274 is attached to the partition member 272 to separate the pumping chamber 230 and the receiving chamber 232, 234 and provide additional damping force in the pumping chamber 30. The decoupler 274 includes a support member 276, made from metal material, and having a generally tubular shape, attached to the partition member 272. The support member 276 extends annularly about the center axis A between a support member upper end 278 and a support member lower end 280. The support member upper end 278 is disposed in the pumping chamber 230. The support member lower end 280 is disposed in the receiving chamber 232, 234. The support member 276 defines a recess 282, having a generally cylindrical shape, extending along the center axis A between the support member upper end 278 and the support member lower end 280. A support member upper flange 284 extends radially outwardly from the support member upper end 278 and annularly about the center axis A to engage the partition member 272. The support member 276 includes a support member lower flange 286 extending radially inwardly from the support member lower end 280 and annularly about the center axis A to engage the distal end 244 of the collar 242.

The decoupler 274 includes a sleeve 288, having a generally tubular shape, disposed in the recess 282 and extending annularly about the center axis A between an upper sleeve end 290 and a lower sleeve end 292. The upper sleeve end 290 is disposed adjacent to the support member upper end 278. The lower sleeve end 292 is disposed adjacent to the support member 276 lower end. The sleeve 288 defines a hole 294, having a generally cylindrical shape, extending between the upper sleeve end 290 and the lower sleeve end 292.

The decoupler 274 includes a core 296, having a generally cylindrical shape, disposed in the hole 294 of the sleeve 288 extending between the upper sleeve end 290 and the lower sleeve end 292. The core 296 defines a passage 298, having a generally cylindrical shape, disposed in fluid communication with the lower portion bore 246 and the receiving chamber 232, 234. A lower sleeve flange 300 extends radially inwardly from the lower sleeve end 292, perpendicular to the center axis A, to engage the core 296 and defining a compartment 302 extending annularly about the center axis A between the lower sleeve flange 300, the sleeve 288, and the core 296. A magnetic actuator 304 is disposed in the compartment 302. The magnetic actuator 304 includes a first bobbin 306, having a generally spool-shape, disposed in the compartment 302 and extends annularly about the center axis A. A first coil 308 extends annularly around the first bobbin 306 and electrically connected to a power source 310 for generating a magnetic field. It should be appreciated that more than one coil can be disposed about the first bobbin 306. In addition, it should be appreciated that a controller 312, e.g. a computer or a central processing unit, can be electrically connected to the power source 310 to control the power output to the first coil 308 thereby controlling the strength of the magnetic field produced by the magnetic actuator 304.

The decoupler 274 includes a moving member 314, having a generally circular shape and made from an elastomeric material, disposed in the pumping chamber 230 on the center axis A and extending radially outwardly from the center axis A to the support member upper end 278. The moving member 314 is attached to the support member upper end 278 to separate the pumping chamber 230 from the receiving chamber 232, 234. A retainer 316, having a generally ring shape, is disposed between the moving member 312 and the support member upper end 78 and extending annularly about the center axis A. The retainer 316 can include a slot extending annularly about the center axis A to receive the moving member 314.

A diaphragm 318, made from an elastomeric material, is disposed in the receiving chamber 232, 234 extending annularly about the center axis A and between the lower portion opened end 238 and the distal end 244 of the collar 242. The diaphragm 318 is sandwiched between the lower portion 224 and the partition member 272 and the support member lower flange 286 and the distal end 244 of the collar 242. The diaphragm 318 divides the receiving chamber 232, 234 into a fluid chamber 232 and a compensation chamber 234. The fluid chamber 232 extends between the diaphragm 318 and the partition member 272. The compensation chamber 234 extends between the lower portion 224 and the diaphragm 318.

The partition member 272 includes an upper spacer 320, made of metal and having a generally circular shape, disposed in the pumping chamber 230, axially adjacent to the upper portion 226 and axially below the upper portion 226, and in engagement with the flexible body flange 270 to sandwich the flexible body flange 270 between the upper portion 226 and the upper spacer 320. The upper spacer 320 includes at least one projection 322 extending outwardly from the upper spacer 320 to engage the flexible body flange 270 for securing the flexible body flange 270 between the upper portion 226 and the upper spacer 320. The upper spacer 320 defines at least one upper spacer groove 324, disposed opposite of the at least one projection 322 and axially spaced from the at least one projection 322, extending annularly about the center axis A along the upper spacer 320. A seal 326, made from an elastomeric material, is disposed in the upper spacer 320 groove and extending annularly about the center axis A.

The partition member 272 includes an electromagnetic support ring 328, having a generally circular shape, disposed in the housing chamber 230, 232, 234 between the upper spacer 320 and the lower portion 224. The electromagnetic support ring 328 extends annularly about the center axis A to sandwich the diaphragm 318 between the electromagnetic support ring 328, the lower portion 224, and the seal 326 between the electromagnetic support ring 328 and the upper spacer 320. The electromagnetic support ring 328 defines a concavity 330, having a generally cylindrical shape, extending along the center axis A to receive the decoupler 274. The electromagnetic support ring 328 further defines at least one channel 332, radially spaced from the concavity 330 and the decoupler 274, extending in a parallel relationship with the center axis A to allow fluid communication between the pumping chamber 230 and the receiving chamber 232, 234. The electromagnetic support ring 328 further defines an electromagnetic groove 334 extending annularly about the center axis A. A second electromagnetic field generator 336 is disposed in the electromagnetic groove 334. The second electromagnetic field generator 336 includes a second bobbin 338, having a generally spool-shape, disposed in the electromagnetic groove 334 and extending annularly about the center axis A. A second coil 340 is annularly wrapped around the second bobbin 338 and electrically connected to the power source 308 for selectively generating a magnetic flux. It should be appreciated that more than one coil can be wrapped about the second bobbin 338.

Figure 8:
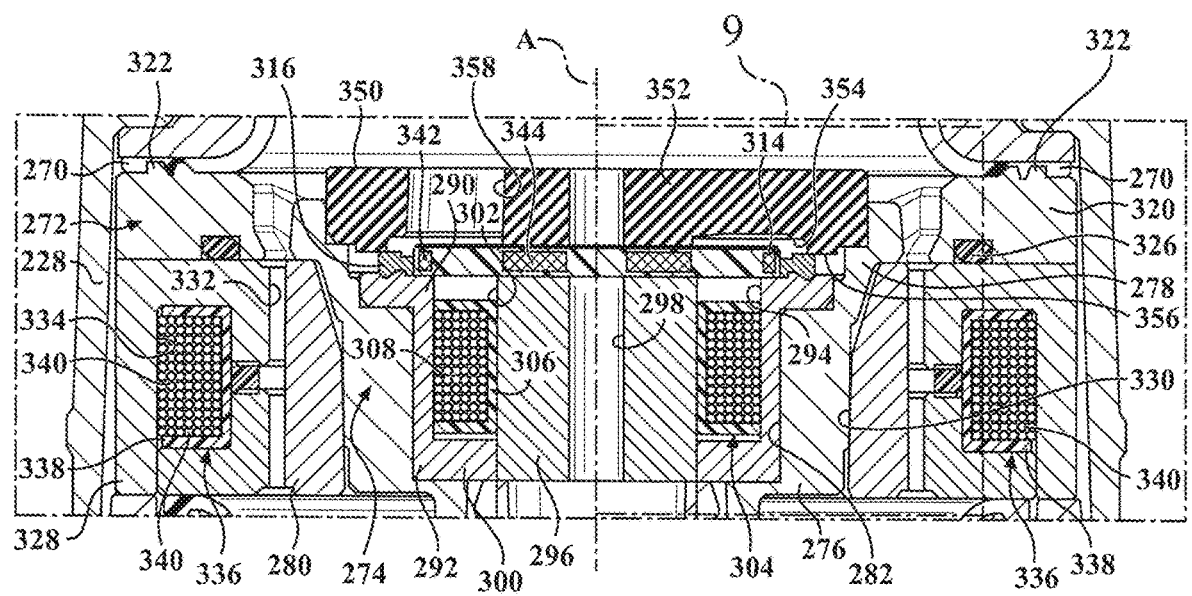
FIG. 8 is an enlarged cross-sectional fragmentary view of the decoupler of the hydraulic mount apparatus of FIG. 7.
Figure 9:
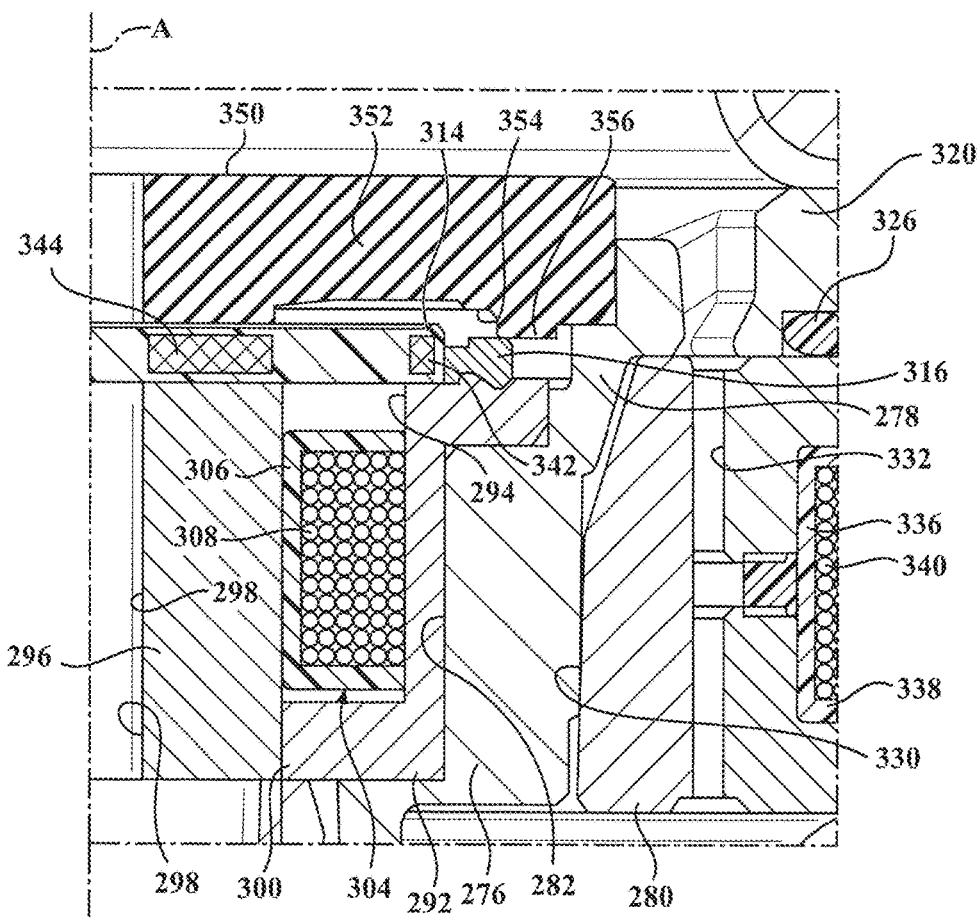
FIG. 9 is an enlarged cross-sectional fragmentary view of the decoupler of the hydraulic mount apparatus of FIG. 8.

As best shown in FIGS. 8 and 9, the moving member 314 includes at least two magnetic inserts 342, 344 disposed spaced from one another and in the moving member 314 to move the moving member 314 from a first position to a second position. In the first position, the moving member 314 is spaced from the core 296 and the sleeve 288 of the decoupler 274. While in the first position, the moving member 314 is able to freely flex in the pumping chamber 230 in response to the excitation movement of the vehicle. In the second position, the moving member 312 is attached to the core 296 and the sleeve 288 of the decoupler 274.

While in the second position, the movement of the moving member 314 is restricted because portions of the moving member 314 that contains the magnetic inserts 342, 344 are attached to the decoupler 274 thereby limiting the flexibility of the moving member 314. By switching between the first position and the second position, the damping force of the moving member 314 can be varied thereby allowing for performance tuning of the hydraulic mount apparatus 220. The at least two magnetic inserts 342, 344 include a first magnetic insert 342 and a second magnetic insert 344. The first magnetic insert 342, having generally circular shape, is disposed adjacent to the upper sleeve end 290 of the sleeve 288 and extending annularly about the center axis A. The second magnetic insert 344, having a generally circular shape, is radially spaced from the first magnetic insert 342 and adjacent to the core 296 and extending tending annularly about the first magnetic insert 342 and the center axis A. A squeeze plate 350, having a generally circular shape, is disposed in the pumping chamber 230, adjacent to the support member upper flange 284, and spaced from the moving member 314 to secure the moving member 314 between the squeeze plate 350 and the support member 276. The squeeze plate 350 has a solid portion 352, having a generally circular shape, spaced from the moving member 314 defining a gap 354 between the solid portion 352 and the moving member 314. The squeeze plate 350 includes a protrusion 356 extending outwardly from the solid portion 352, annularly about the center axis A, to the moving member 314 to secure the moving member 314 between the squeeze plate 350 and the support member 276. The solid portion 352 defines at least one orifice 358 extending through the squeeze plate 350 and in alignment with the hole 294 for allowing the magnetorheological fluid to flow through the squeeze plate 350.

Figure 10:
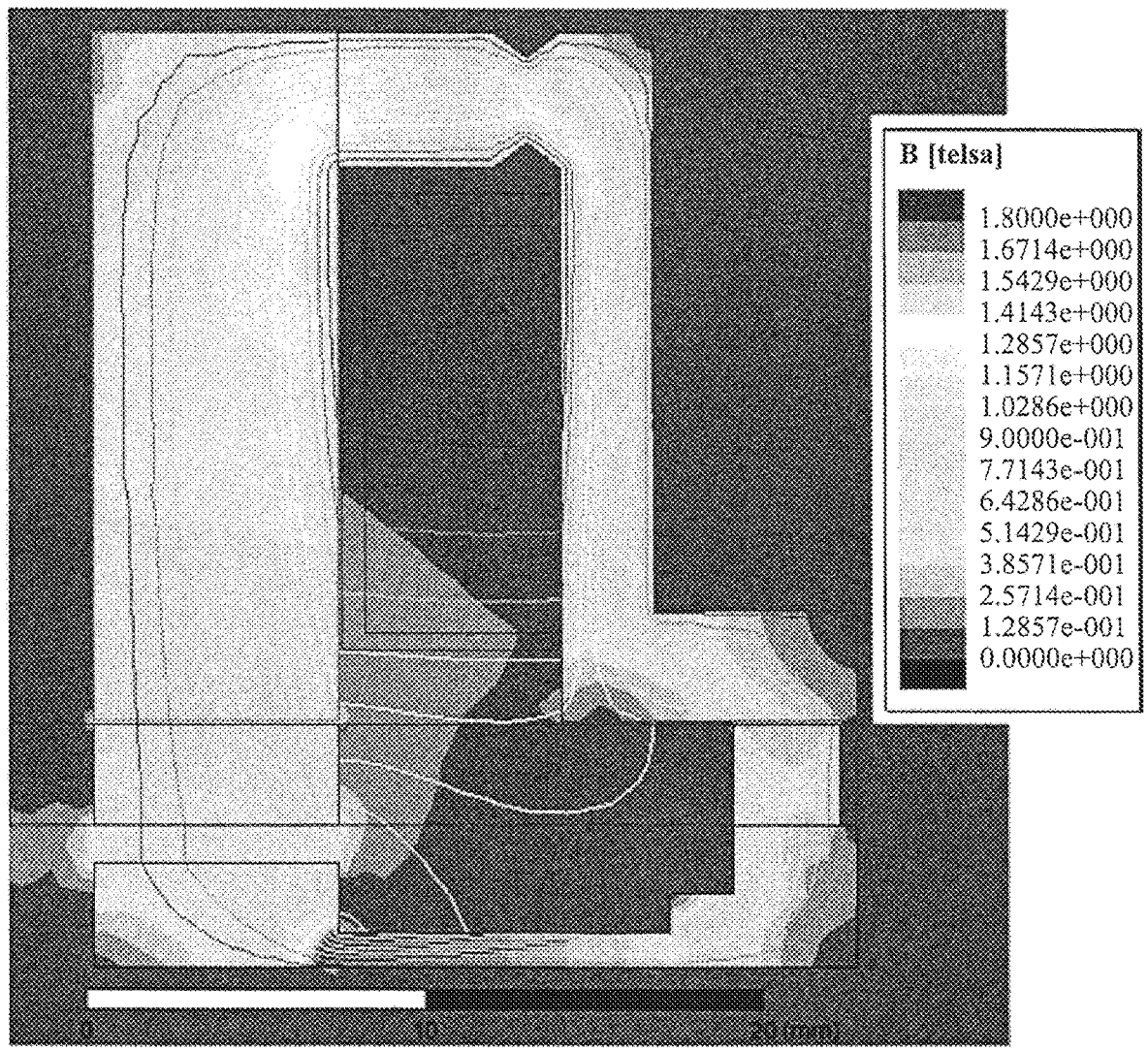
FIG. 10 is a graph showing the magnetic field of the alternative embodiment of the decoupler of the hydraulic mount apparatus including the squeeze plate.
Figure 11:
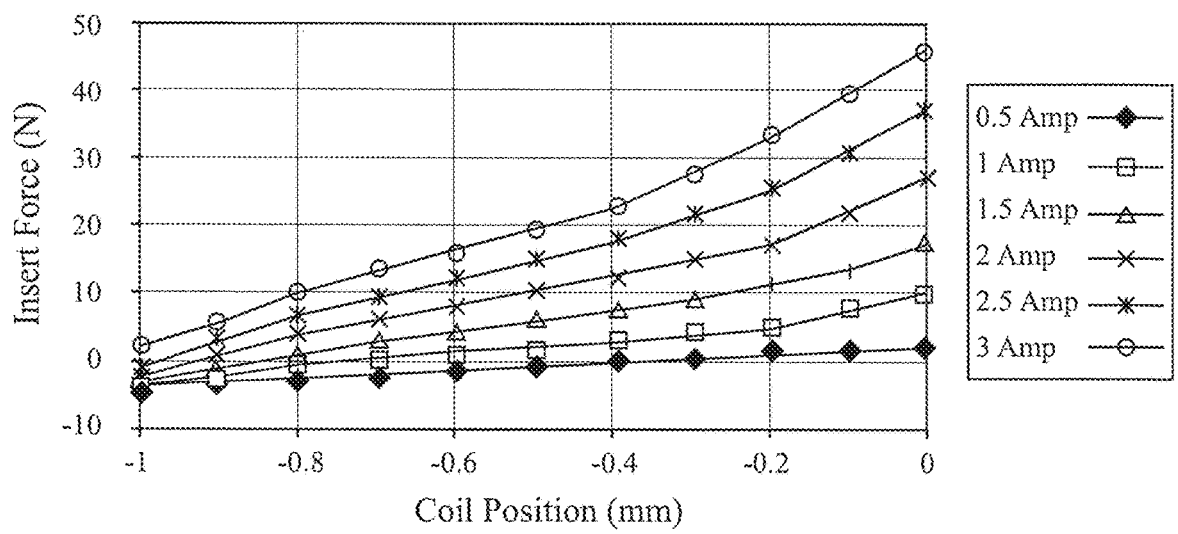
FIG. 11 is a graph showing the magnetic inserts' force versus the position of the magnetic inserts for the alternative embodiment of the hydraulic mount apparatus.
Figure 12:
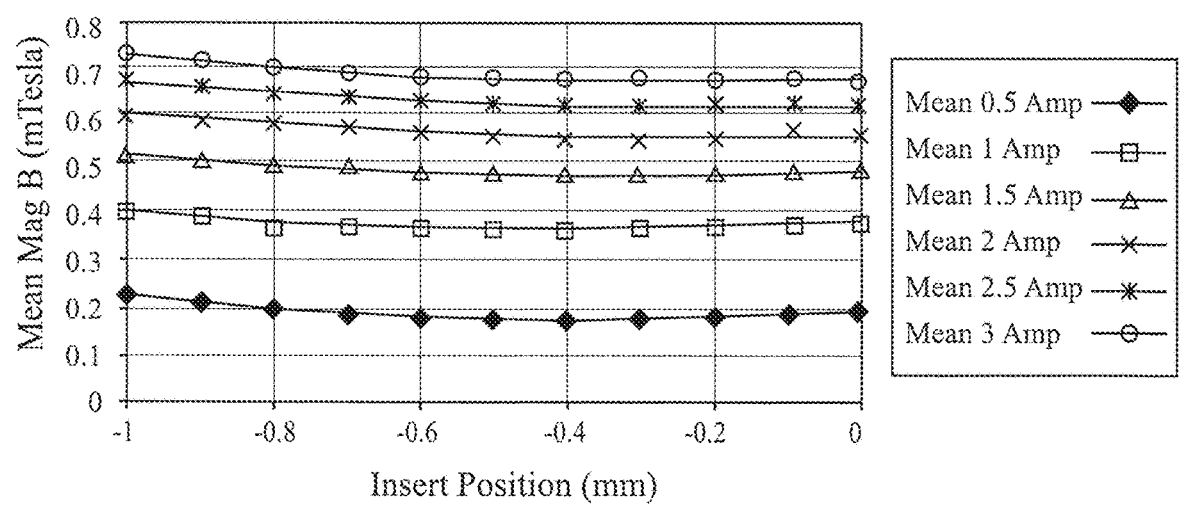
FIG. 12 is a graph showing the magnetic inserts' force and fluid force versus the position of the magnetic inserts for the alternative embodiment of the hydraulic mount apparatus.

In operation, as the hydraulic mount apparatus 220 receives an excitation movement, e.g. a vibrational movement, the flexible body 256 deforms thereby causing a change in the volume of the pumping chamber 230, the receiving chamber 232, and the compensation chamber 234. As a result, the moving member 314 flexes in the pumping chamber 230 in response to the excitation movement. To change the damping rate provided by the moving member 314, power is provided to the magnetic actuator 304 by the power source 310. As the magnetic actuator 304 receives power from the power source 310, the first coil 308 of the magnetic actuator 304 energizes and produces a magnetic field. As illustrated in FIG. 10, in response to the magnetic field, the magnetic inserts 342, 344 and the solid portion 352 of the squeeze plate 350 become part of the magnetic circuit, along with the magnetorheological fluid. In addition, in response to the magnetic field, the magnetic inserts 342, 344 pull the moving member 314 including the magnetic inserts 342, 344 from the first position to the second position thereby changing the rate of damping of the decoupler 274 and allow for performance tuning. In other words, in response to the magnetic field the moving member 314 is moved from being spaced from the core 296 and the sleeve 288 of the decoupler 274 to being attached to the core 296 and the sleeve 288 of the decoupler 274. At the same time, the magnetic flux density in the gap between the moving member 314 and the squeeze plate 350 is increased thereby affecting the magnetorheological fluid between the moving member 314 and the squeeze plate 350. As the moving member 314 flexes between the squeeze plate 350 and the decoupler 74, the magnetorheological fluid in the gap 354 between the solid portion 352 and the moving member 314 is being squeezed out from the squeeze plate through the orifice 358, i.e. a squeeze-flow mode. The magnetic inserts' 342, 344 forces (N) in response to the magnetic field vs. the position of the magnetic inserts 342, 344 are monitored and illustrated in FIG. 11. Furthermore, the mean magnetic field of at the gap 352 vs. the position of the magnetic inserts 342, 344 is monitored and illustrated in FIG. 12.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims.

What is claimed is:

1. A hydraulic mount apparatus comprising:
a housing having an upper portion and a lower portion disposed on a center axis and defining a housing chamber;
a partition member disposed in said housing chamber dividing said housing chamber into a pumping chamber and a receiving chamber with said pumping chamber being between said upper portion and said partition member and said receiving chamber being between said lower portion and said partition member;
a decoupler including a magnetic actuator attached to said partition member separating said pumping chamber and said receiving chamber;
a moving member of elastomeric material disposed in said pumping chamber attached to said decoupler; and
said moving member including at least two magnetic inserts disposed in said moving member, radially spaced apart from one another to move said moving member from a first position to a second position in response to a magnetic field, said first position being defined as said moving member being spaced from said decoupler, said second position being defined as said moving member being attached to said decoupler,
wherein said elastomeric material of said moving member entirely surrounds said at least two magnetic inserts to enclose said at least two magnetic inserts in said moving member.

2. The hydraulic mount apparatus as set forth in claim 1 wherein said decoupler includes a core and a sleeve and said at least two magnetic inserts include a first magnetic insert and a second magnetic insert with said first magnetic insert being disposed adjacent to said sleeve and said second magnetic insert being disposed adjacent to said core and radially spaced from said first magnetic insert.

3. The hydraulic mount apparatus as set forth in claim 2 wherein said first magnetic insert has a circular shape extending annularly about said center axis and said second magnetic insert has a circular shape radially spaced from said first magnetic insert and extending annularly about said center axis.

4. The hydraulic mount apparatus as set forth in claim 2 further including a cap disposed in the pumping chamber adjacent the moving member to secure the moving member between the cap and the decoupler.

5. The hydraulic mount apparatus as set forth in claim 4 wherein said cap defines at least one orifice extending through the cap for allowing magnetorheological fluid to flow through the cap.

6. The hydraulic mount apparatus as set forth in claim 5 wherein said at least one orifice includes a plurality of orifices radially and circumferentially spaced from one another.

7. The hydraulic mount apparatus as set forth in claim 2 wherein said decoupler includes a support member attached to said partition member and extending annularly about and along said center axis between a support member upper end and a support member lower end with said support member upper end being disposed in said pumping chamber and said support member lower end being disposed in said receiving chamber and defining a recess extending along said center axis between said support member upper end and said support member lower end.

8. The hydraulic mount apparatus as set forth in claim 7 further including a retainer disposed between said moving member and said support member upper end and extending annularly about said center axis to receive said moving member.

9. The hydraulic mount apparatus as set forth in claim 7 wherein said sleeve is disposed in said recess and extends between an upper sleeve end and a lower sleeve end with said upper sleeve end being disposed adjacent to said support member upper end and said lower sleeve end being disposed adjacent to said support member lower end and defining a hole extending between said upper sleeve end and said lower sleeve end.

10. The hydraulic mount apparatus as set forth in claim 9 wherein said core is disposed in said hole of said sleeve extending between said upper sleeve end and said lower sleeve end and defines a passage disposed in fluid communication with said receiving chamber.

11. The hydraulic mount apparatus as set forth in claim 10 further including a lower sleeve flange extending radially inwardly from said lower sleeve end to engage said core and defining a compartment between said lower sleeve flange and said sleeve and said core.

12. The hydraulic mount apparatus as set forth in claim 11 wherein said magnetic actuator is disposed in said compartment and includes a first bobbin disposed in said compartment and a first coil wrapped around said first bobbin and electrically connected to a power source for selectively generating a magnetic field.

13. The hydraulic mount apparatus as set forth in claim 12 wherein said partition member includes an electromagnetic support ring disposed in said housing chamber and extending about said center axis.

14. The hydraulic mount apparatus as set forth in claim 13 wherein said electromagnetic support ring defines a concavity extending along said center axis to receive said decoupler and at least one channel radially spaced from said concavity and said decoupler to allow fluid communication between said pumping chamber and said receiving chamber.

15. The hydraulic mount apparatus as set forth in claim 14 wherein said electromagnetic support ring further defines an electromagnetic groove extending annularly about said center axis.

16. The hydraulic mount apparatus as set forth in claim 15 further including an electromagnetic field generator disposed in said electromagnetic groove including a second bobbin disposed in said electromagnetic groove and a second coil wrapped around said second bobbin and electrically connected to a power source for generating additional magnetic field.

17. A hydraulic mount apparatus comprising:
a housing having an upper portion and a lower portion disposed on a center axis and defining a housing chamber;
a partition member disposed in said housing chamber dividing said housing chamber into a pumping chamber and a receiving chamber with said pumping chamber being between said upper portion and said partition member and said receiving chamber being between said lower portion and said partition member;
a decoupler including a magnetic actuator attached to said partition member separating said pumping chamber and said receiving chamber;
a moving member of elastomeric material disposed in said pumping chamber attached to said decoupler;
said moving member including at least two magnetic inserts disposed in said moving member, radially spaced apart from one another to move said moving member from a first position to a second position in response to a magnetic field, said first position being defined as said moving member being spaced from said decoupler, said second position being defined as said moving member being attached to said decoupler;
a squeeze plate disposed in said pumping chamber and adjacent to said moving member to secure said moving member between said squeeze plate and said decoupler; and
said squeeze plate including a solid portion spaced from the moving member defining a gap and a protrusion extending outwardly from said solid portion to said moving member to secure said moving member between said squeeze plate and said decoupler;
wherein said elastomeric material of said moving member entirely surrounds said at least two magnetic inserts to enclose said at least two magnetic inserts in said moving member.

18. The hydraulic mount apparatus as set forth in claim 17 wherein said solid portion of said squeeze plate defines at least one orifice extending through said squeeze palate for allowing magnetorheological fluid to flow through said squeeze plate.

19. The hydraulic mount apparatus as set forth in claim 17 wherein said at least two magnetic inserts includes a first magnetic insert and a second magnetic insert with said first magnetic insert being disposed about said center axis and said second magnetic insert being disposed radially spaced from said first magnetic insert and about said center axis.

20. The hydraulic mount apparatus as set forth in claim 19 wherein said first magnetic insert has a circular shape extending annularly about said center axis and said second magnetic insert has a circular shape radially spaced from said first magnetic insert and extending annularly about said center axis.

* * * * *